Patented July 14, 1942

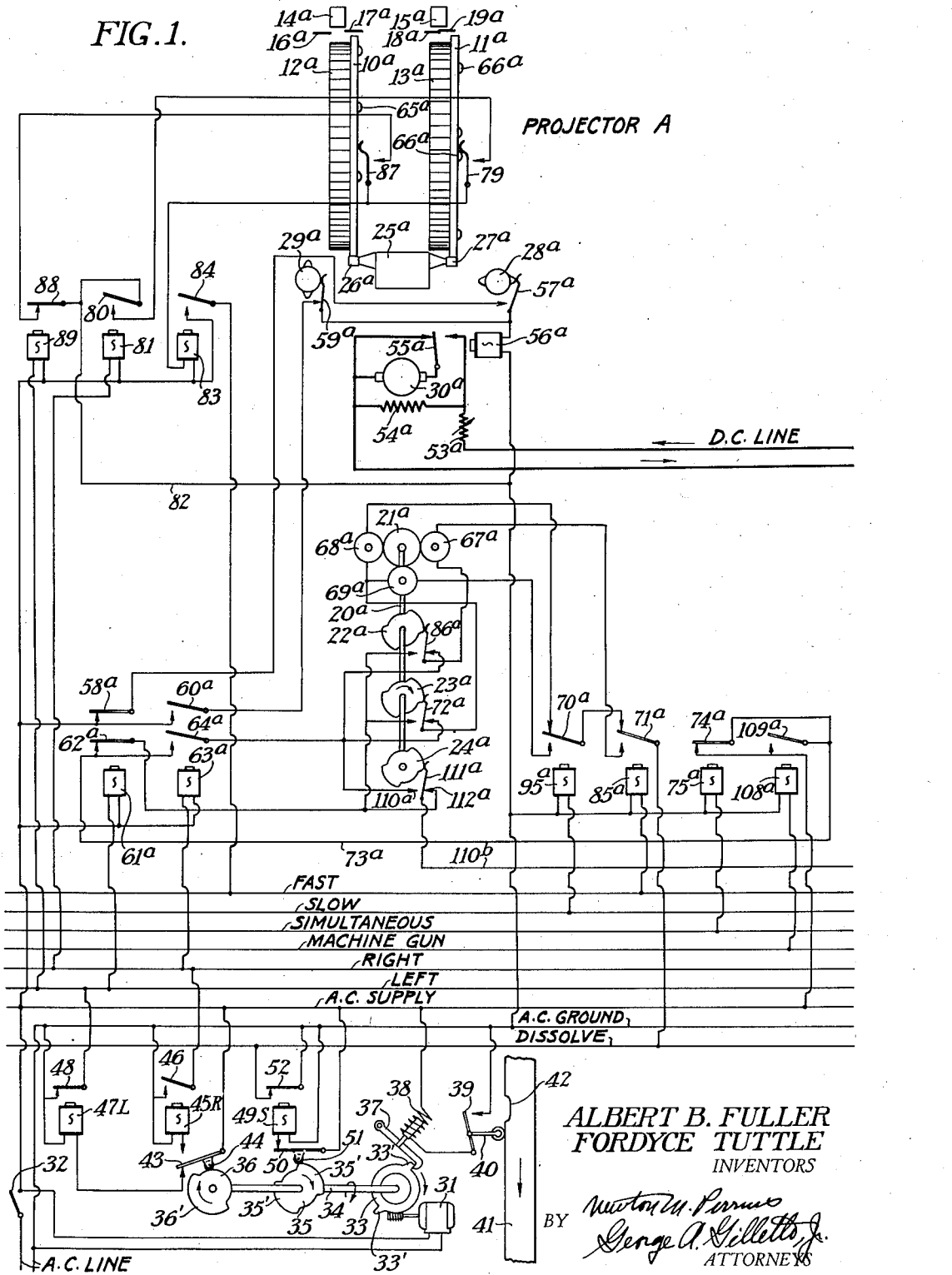

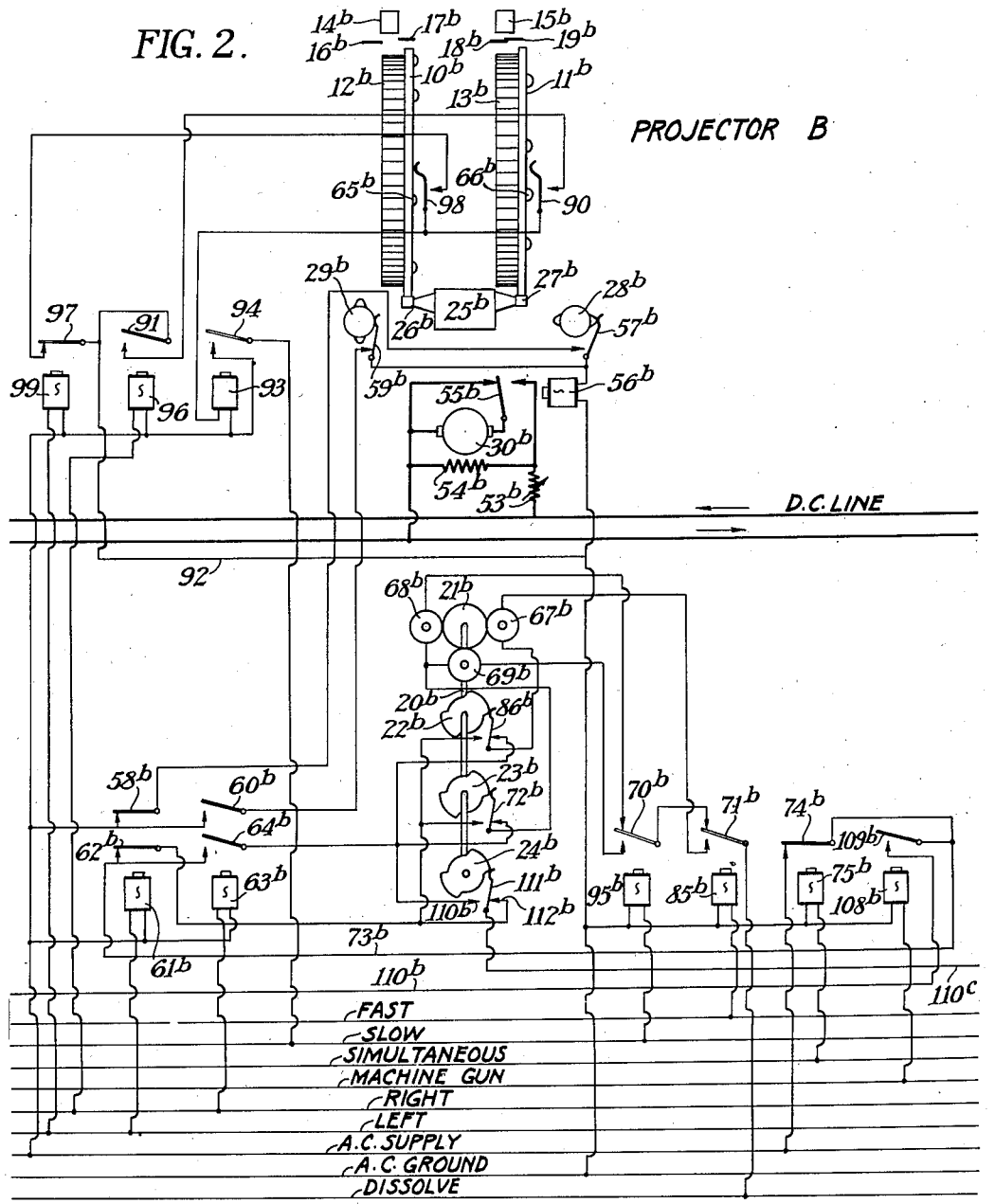

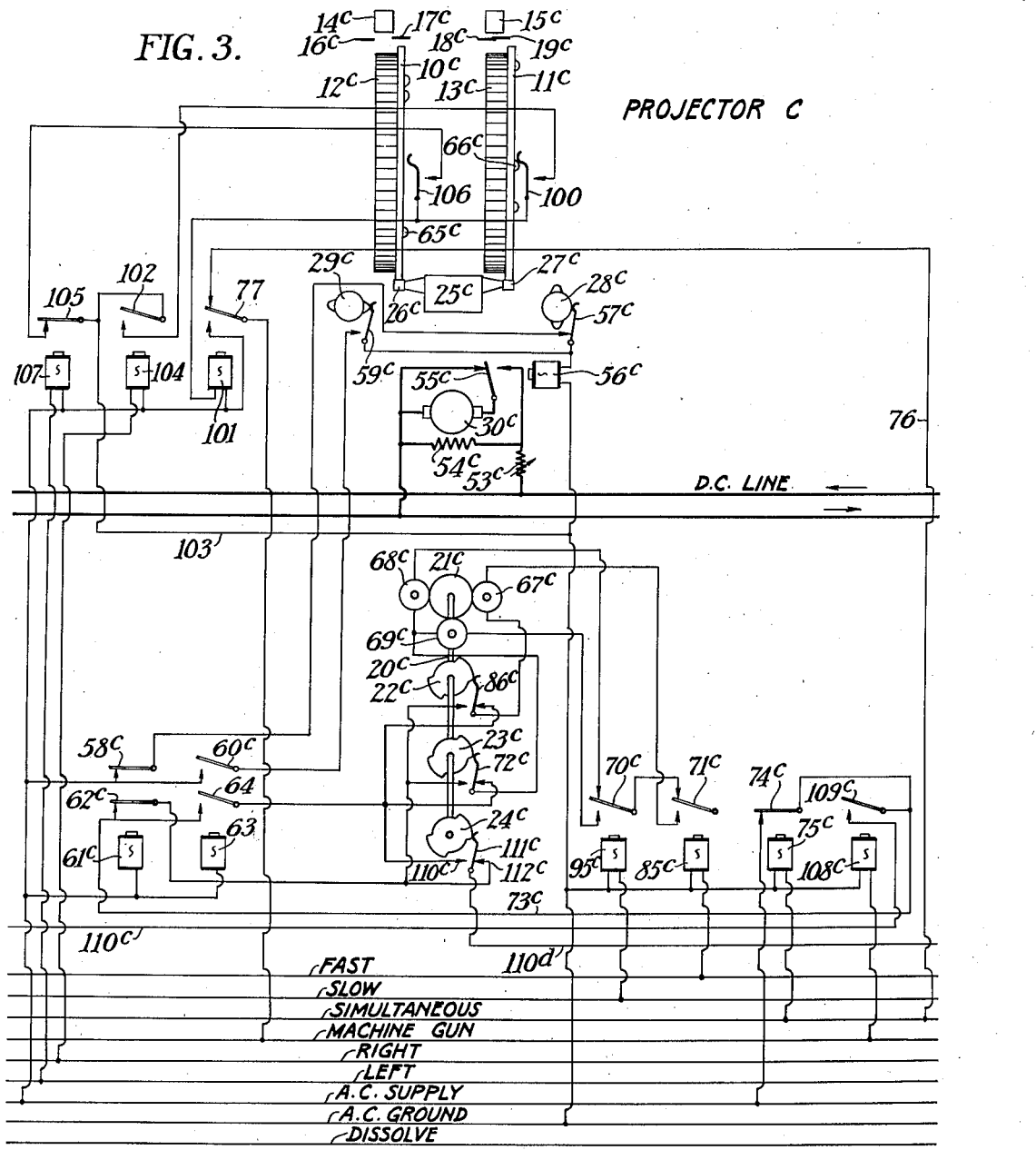

2,289,833

UNITED STATES PATENT OFFICE 2,289,833

AUTOMATIC CONTROL SYSTEM FOR
PHOTOGRAPHIC PROJECTORS

Albert B. Fuller and Fordyce Tuttle, Rochester,
N. Y., assignors to Eastman Kodak Company,
Rochester, N. Y., a corporation of New Jersey Application August 2, 1940, Serial No. 350,006

21 Claims. (Cl. 88—28)

The present invention relates to an automatic control system for photographic projectors and more particularly to a fully automatic system in which the projectors themselves determine the programing or special effects with which the individual picture images shall be projected.

Heretofore it has either been necessary to manually control different effects to be produced by a plurality of projectors or to use extremely complicated controls which must be synchronized with the projectors. It was also a fact that the projection of a program of pictures becomes monotonous and fails to hold the attention of an audience unless there is some variety in the manner of projecting the pictures or in introducing and discontinuing them.

The primary object of the present invention is the provision of a fully automatic control system for photographic pictures in which the projectors or image carriers thereon function as relays to determine and control the special effects with which the pictures are to be introduced, shown and discontinued.

A further object of the invention is an automatic control system for a plurality of photographic projectors each comprising a pair of image carriers whereby all of the corresponding image carriers of the projectors are simultaneously indexed.

Another object of the invention is the provision of an automatic control system including a plurality of special effect shutter motor control circuits which are determined or arranged by programing projections on the image carriers of the projectors.

Still another object of the invention is the provision of index control means for indexing like image carriers of the several projectors and a shutter control means supervised by projections on the image carriers and for determining the type of shutter operation to occur, a master control means first causing the image carriers to index whereupon the shutter control circuits are established and are only rendered operative by the master control means after all of the image carriers have been indexed.

A still further object of the invention is the provision of a shutter operating motor for driving the shutter assemblies at a definite speed and the provision of another shutter operating motor for driving the shutter assemblies at a faster or slower speed, the shutter motor control circuits determining the shutter motor to be operative being established by a programing projection on one of the image carriers of one of the projectors.

A further object of the invention is the provision of a shutter operating control circuit for each projector and arranged so that said circuits become operative successively whereby the images from the projectors are successively shown and a "machine gun" effect is produced.

A still further object of the invention is the provision of shutter operating control circuits arranged for successive energization and a master shutter control circuit associated with the image carriers of one of the projectors whereby a projection on such image carriers may change over the shutter control circuits for simultaneous operation of the shutter assemblies to the successive arranged shutter control circuits for the "machine gun" type of projection.

Other and further objects of the invention will be apparent or suggested to those skilled in the art by the disclosure which follows.

The above-mentioned and other objects of the invention are embodied in a control system for a plurality of projectors, the projectors each comprising a pair of image carriers, a pair of indexing assemblies for said image carriers and a pair of shutter assemblies associated with respect to the image carriers and the control system comprising a master control means operated at predetermined intervals and including a master index control member and a master shutter control member, a plurality of indexing operating control means each corresponding to a projector assembly, supervised by master index control member, and effecting simultaneous indexing of all of the corresponding image carriers of said projector assemblies, and a plurality of shutter operating control means each corresponding to a projector assembly, established as to character by projections on certain of the image carriers, supervised by said master shutter control member and for operating said shutter assemblies to open that one of each pair which is associated with the image carrier just indexed and to produce a predetermined projection effect.

Reference is hereby made to the accompanying drawings wherein similar reference characters designate similar elements and wherein:

Figs. 1, 2 and 3 are, respectively, portions of the same wiring diagram and representations of three projector assemblies.

In the illustrated embodiment of the invention only three projector assemblies have been indicated but it must be clearly understood that any number of projector assemblies can be controlled by the system of the invention by a mere duplication of the control and operating circuits shown herein.

The projector assemblies and indexing and shutter operating means thereof may be of known form, however, it is preferable that the image carriers and indexing assemblies be made according to the disclosures of our copending applications, Serial No. 350,004, filed August 2, 1940, for Photographic projector and Serial No. 350,005, filed August 2, 1940, for Photographic slide projector and that the shutter assemblies be made according to the disclosure of the copending application of Raymond W. Wengel, Serial No. 347,442, filed July 25, 1940, for Projector shutters.

For clarity of reference, the projector assemblies shown shall be designated as Projector A, Projector B and Projector C and the associated operating members and circuit control members will be designated by reference numerals followed by a, b, or c, as the case may be.

The Projector A comprises a pair of image carriers 10a and 11a, respectively carrying a plurality of transparent slides 12a and 13a. Such image carriers 10a and 11a are supported for rotation so that an illuminating system may direct a light beam through the individual transparent slides 12a or 13a and through the respective projection lenses 14a and 15a onto a screen. A pair of shutter assemblies is associated with each of said image carriers, one shutter assembly including shutter blades 16a and 17a and the other shutter assembly including shutter blades 18a and 19a. Said shutter assemblies are innerconnected in a known manner so that one assembly is open when the other is closed and so that the closing movement of the open shutter assembly occurs simultaneously with the opening movement of the closed shutter assembly to produce on the screen the well known cross-dissolve. A driving means is connected to each pair of shutter assemblies and may comprise a vertical shaft 20a carrying a gear 21a and a plurality of switch cams 22a, 23a and 24a which preferably have diametrically opposed rises of approximately 90° angular extent.

The indexing assembly for each projector is preferably constructed according to our copending application, Serial No. 350,005, filed August 2, 1940, for Photographic slide projector and comprises a housing 25a from which extends on one side a driving member 26a operatively connected to image carrier 10a and on the other side a driving member 27a operatively connected to the image carrier 11a. An indexing motor 30a is connected to drive through suitable springs and escapement mechanism, not shown, the driving members 26a and 27a, the sequence of operation being that the driving member 26a is rotated to advance the image carrier 10a while the image carrier 11a remains stationary and during the next indexing cycle the driving member 27a indexes the image carrier 11a while the image carrier 10a remains stationary. Directly connected to the driving connection between motor 30a and the driving members 26a and 27a is a limit cam 28a and a second limit cam 29a. As a result, when indexing motor 30a is operated said limit cams 28a and 29a are rotated but carry respective diametrically opposed rises which are angularly displaced at 90° for a purpose to be later described.

The elements of the other projector assemblies, such as Projectors B and C are identical to those just described for Projector A so that the description of the additional projector assemblies need not be undertaken.

A master control means is operated at predetermined intervals and determines the time at which a projection change shall occur, whereas, the index operating control means and shutter operating control means determine which projector element will be operated and how it shall be operated.

The master control means comprises a motor 31 connected across an A. C. supply line including a starting switch 32. A double toothed cam 33 is mounted on a shaft 34 which also carries the master shutter control member or cam 35 and a master index control member or cam 36. Said double toothed cam 33 and shaft 34 are driven by said motor 31 through a tendency drive, not shown. A pawl 37 is arranged to engage either of the teeth 33' on cam 33 and is operated by a solenoid 38 having one side connected to an A. C. supply bus which is connected to one leg of the A. C. supply line and the other side connected through a normally closed switch 39 to an A. C. ground bus which is connected to the other leg of the A. C. supply line. A roller arm 40 is connected to the switch arm 39 and bears against the edge of a timing film 41 which is provided with notches, such as notch 42 and which may also carry a sound record for accompanying the pictures being projected.

In order to simplify the wiring and wiring diagrams for a large bank of projector assemblies, several buses extend along the machines. Such buses are designated in Figs. 1, 2 and 3 as "dissolve, A. C. ground, A. C. supply, left, right, machine gun, simultaneous, slow dissolve and fast dissolve" and these buses shall be deemed to be continuous between Figs. 1, 2 and 3.

A master index control circuit is included in the master control means and comprises a double pole contactor 43 carrying a roller 44 in engagement with the periphery of the master index control cam 36. A solenoid 45R has one side connected to one pole of the double contactor 43 and the other side connected to the A. C. ground bus. A normally open switch 46 is arranged to be closed by said solenoid 45R, has one side connected to the A. C. ground bus and the other side connected to the "right" bus. A solenoid 47L has one side connected to the other pole of double contactor 43 and its other side connected to the A. C. ground bus. A normally open switch 48 is arranged to be closed by solenoid 47L and has one side connected to the A. C. ground bus and the other side connected to the "left" bus.

By means of the master index control circuit, either the "right" or "left" bus will be connected to one leg of the A. C. source. As shown in Fig. 1, the double contactor 43 is at the position to energize the solenoid 47L and close the switch 48 whereupon the A. C. ground bus is connected to the "left" bus. The cam 36 has a peripheral rise 36' arranged to engage the roller 44 to raise the contactor 43, thus de-energizing solenoid 47L, and to complete the circuit of solenoid 45R across the A. C. buses. Under these circumstances the switch 46 is closed and the A. C. ground bus is connected to the "right" bus. The switch 48 opens as soon as contactor 43 is lifted by cam rise 36'.

The master control means also includes a master shutter control circuit comprising a solenoid 49S having one side connected to the A. C. ground bus and having its other side connected through a normally open switch arm 50 to the A. C. supply bus. Said switch arm 50 carries a roller 51 arranged to engage the periphery of the master shutter control cam 35 which has opposite rises 35'. A normally open switch 52 has one side connected to the A. C. ground bus and its other side connected to the dissolve bus so that upon energization of solenoid 49S the dissolve bus is connected to the A. C. ground bus.

The operation of the master control means will now be described. The master index control cam 36 and the master control cam 35 and the respective rises 36' and 35' thereon are arranged in timed relation so that the master index control circuit has sufficient time to function and the image carriers have time to index before the master shutter control circuit is energized. When the starting switch 32 is closed the motor 31 is started but the pawl 37 being normally in engagement with one of the teeth 33' of the cam 33 prevents the rotation of shaft 34 or the cams 35 and 36 thereon. However, when a notch 42 in the film 41 comes opposite the roller arm 40, the switch 39 is closed and solenoid 38 is energized to raise the pawl 37 and to permit the tendency drive between motor 31 and cam 33 to rotate said cam 33 and the shaft 34. The notches 42 in the film 41 are short enough so that switch 39 is again opened and solenoid 38 de-energized before the next tooth 33' passes the pawl 37. Hence, for each notch in the film the cam 33 is rotated 180°. As soon as the cam 35 starts to rotate and before the rise 36' on cam 36 reverses the contactor 43, the roller 51 and switch 50 drop into the dwell between cam rises 35' to de-energize the master shutter control circuit. Soon thereafter the rise 36' of the master index control cam 36 engages roller 44 to move contactor 43 into contact with its other pole so that the solenoid 47L is de-energized and the solenoid 45R is energized.

During the time that roller 51 is in the dwell of the master shutter control cam 35, the index control and index operating circuits function and the shutter control and shutter operating circuits are established by the image carriers. When the rise 35' of the master shutter control cam again closes switch 50, the solenoid 45R is still energized and the predetermined shutter operation takes place. It should be understood that the first 180° rotation of the cam 33 moves the cam 36 through a corresponding angle in which position the rise 36' is still in engagement with the roller 44 and during the next 180° rotation of cam 33 the roller 44 moves off the rise 36' and into the dwell of cam 36.

The index motor control circuit includes a variable resistance 53a, a shunt field coil 54a and a double pole contactor 55a normally short-circuiting the armature of indexing motor 30a but movable into contact with its other pole to connect the motor armature across the current supply means. On account of the motor operating characteristics required for indexing, a D. C. supply is preferred but it is to be understood that an A. C. supply may be used. When the contactor 55a is in the normal position shown, the motor armature is short-circuited and the motor is stopped or braked rapidly.

A pair of index control circuits have a portion in common including a solenoid 56a one side of which is connected to the A. C. ground bus for moving the contactor 55a to energize the motor operating circuit and one of the index control circuits includes a limit switch 57a arranged to be operated by the limit cam 28a and extends through one arm 58a of a double pole normally open relay to the A. C. supply bus and the other index control circuit extends through a limit switch 59a arranged to be operated by the limit cam 29a and through an arm 60a of another normally open double pole relay to the A. C. supply bus.

The aforementioned normally open double pole relays are connected to form electrical interlocks so that only one of said index control circuits may be energized at one time. One of said double pole relays comprises a solenoid 61a having one side connected to the A. C. supply and having the other side connected to the "left" bus. Said solenoid 61a is adapted when energized to close the aforementioned arm 58a and also a relay arm 62a. Similarly, a second double pole relay comprises a solenoid 63a having one side connected to the A. C. supply bus and having its other side connected to the "right" bus. When energized, the solenoid 63a closes the aforementioned arm 60a and another relay arm 64a whose function will be described later.

The index operating circuit and index control circuits for all of the projector assemblies are shown in the position following the opening of one of the index control circuits by the limit switch 57a actuated by the limit cam 28a. If a notch 42 passes the roller arm 40 the master index control solenoid 45R will be energized and the solenoid 63a of the double pole relay will be energized to close relay arms 60a and 64a. At the same time the master index control solenoid 47L will be de-energized as well as the solenoid 61a of the double pole relay to open the relay arms 58a and 62a, whereupon the index control circuit will be completed through the relay arm 60a, limit switch 59a and solenoid 56a to A. C. ground. Energization of solenoid 56a operates the contactor 55a to place the motor 30a across the D. C. supply line and the indexing assembly will be operated. As previously explained, operation of the indexing assemblies will rotate the limit cam 29 and indexing motor 30a will be operated until a rise on limit cam 29a opens the corresponding index control circuit. Although the rise on limit cam 28a permits the limit switch 57a to close soon after an indexing cycle is started, the relay arm 58a of the double pole interlocking relay is open so that said limit switch 57a is for the time being ineffective. The next notch 42 of the film again reverses the energization of the master index control circuits and of the interlocking relays so that the other index control circuit becomes operative for another indexing cycle.

Inasmuch as the index motor circuits and index control circuits for each projector assembly are identical they will not be explained in detail. However, it will be evident that the corresponding index control circuits will all be simultaneously energized so that all of the corresponding image carriers of each projector assembly will be simultaneously indexed, for instance passage of the notch 42 to operate the master control means will cause all of the right-hand image carriers to be indexed, whereas, the next notch in the film will cause the left-hand image carriers to be indexed.

As previously mentioned, a program may become monotonous unless different effects are produced at various times during the program. These different effects may be obtained in the control system of the present invention by the establishment of various shutter control circuits and the establishment of desired shutter control circuits is determined by program projections on the image carriers. For instance, image carrier 10a has program projections 65a and image carrier 11a has program projections 66a.

One form of varying the program is to change the speed of cross-dissolve from one image to another. Herein disclosed are control circuits for operating the shutter assemblies for three speeds of shutter dissolve but it should be understood that a greater or less number of speeds can be used according to the same principles. Associated with the gear 21a on the vertical shaft 20 of the shutter assembly are three motors, a motor 67a for fast operation of the shutter assembly, a motor 68a for medium speed operation of the shutter assembly, and a motor 69a for slow speed operation of the shutter assembly. It is obvious that different speed motors may be utilized for these different speed shutter drives or that all of the motors may be of the same speed with appropriate gearing interposed to give the fast, medium or slow speed operation to the gear 21a. It should also be understood that each of these motor drives is preferably connected to the gear 21a through an overrunning clutch so that when one of the said motors is driving the other two motors may remain stationary.

The shutter motor operating circuit for medium speed operation of the shutter assemblies extends on one side from the motor 68a through the normally closed side of a double pole contactor 70a and also through the normally closed side of a second double pole contactor 71a and to the dissolve bus. The other side of said shutter motor operating circuit extends to a switch arm 72a held by the rise on switch cam 23a against a contact which is connected to the relay arm 64a of the interlocking relays. Said shutter motor operating circuit then extends through a wire 73a to the arm 74a of a normally open contactor and then to the A. C. supply bus. It will be understood that as soon as the normally open switch 52 of the master shutter control is closed the shutter motor operating circuit just described will be completed across the source of alternating current.

A solenoid 75a has one side connected to the simultaneous bus and the other side connected to the A. C. ground bus. Said simultaneous bus is energized through a normally closed control circuit, see Projector C of Fig. 3 which includes a wire 76 extending from the simultaneous bus to the normally closed side of a normally closed contactor 77, the other side of contactor 77 being connected to the A. C. supply bus. Thus, with contactor 77 in the position shown, solenoid 75a and the corresponding solenoids of all of the projector assemblies are normally energized to close the contactor 74a to complete the circuit through the medium speeding shutter operator motor 68a. However, such medium speed shutter operation cannot occur until the switch 52 of the master shutter control circuit is closed.

Operation or rotation of the gear 21 by the motor 68a rotates the vertical shaft 20a and the switch cams 22a, 23a, and 24a thereon. When the rise on switch cam 23a passes the switch arm 72a, said switch arm 72a moves to open the shutter operating circuit through the motor 68a and incidentally moves switch arm 72a against another contact which is connected through the relay arm 62a of the "left" interlocking relay, through the contactor 74a to the A. C. supply. In other words, the motor operating circuit is prepared for the return movement of the shutter assemblies by the switch cam 33a but the interlocking relay prevents such operation until the proper time. Assume now that fast shutter operation is desired for the transparent slide 13a about to be indexed into the gate of Projector A. A program stud 66a has been affixed to the image carrier 11a in position to operate a switch arm 79 to engage a normally open contact which is connected to the contact of a normally open switch arm 80. Said switch arm 80 will be closed by energization of a solenoid 81 which has one side connected to the A. C. supply bus and the other side connected to the "right" bus. Accordingly, solenoid 81 will not be energized until the corresponding master control solenoid 45R has been energized. After switch arm 80 is closed the fast shutter control circuit may then extend through a wire 82 to the A. C. ground bus. Said switch arm 79 is connected to one side of a solenoid 83 which has its other side connected to the A. C. supply bus, thus completing a fast shutter control circuit. Said solenoid 83 is arranged to close a normally open relay arm 84 which has one side to the A. C. supply bus and which has the other side connected to the fast dissolve bus. A solenoid 85a has one side connected to said fast dissolve bus and the other side connected to the A. C. ground bus to be energized thereby and move the normally closed contactor 71a into its opposite position whereupon the fast shutter motor operating circuit is completed.

The fast shutter motor operating circuit extends from one side of the motor 67a through the contactor 71a to the dissolve bus from whence it may be connected to the A. C. ground bus when the master shutter circuit is closed. The other side of motor 67a is connected through a switch arm 86a bearing against the periphery of switch cam 22a and such fast motor operating circuit then extends through the relay arm 64a, which, of course, will be closed at the time, through the wire 73a, contactor 74a to the A. C. supply bus. Completion of such fast shutter motor operating circuit will cause the motor 67a to drive gear 21 at a fast speed, motors 68a and 69a remain unaffected because of the overrunning clutches between those motors and the gear 21a. When the rise on switch cam 22a has passed the end of switch arm 86a, said switch arm will be moved against the opposite contact to prepare such fast shutter motor operating circuit to be completed through the relay arm 62a of the "left" interlocking relay when the same is closed.

A switch arm 87 is mounted adjacent the image carrier 10a and may be operated by a program stud 65a thereon to close a normally open contact connected to the contact of a normally open relay arm 88. A solenoid 89 has one side connected to the "left" bus and the other side connected to the A. C. supply bus and is not energized until the "left" bus is made alive by energization of the master control solenoid 47L.

The relays consisting of switch arms 80 and 88 and solenoids 81 and 89 also constitute interlocking relays which permit only one of the switch arms 79 or 87 to be operative. When the program stud 66a closes the switch arm 79 by the indexing of image carrier 11a, solenoid 81 will be energized and switch arm 80 closed, while at the same time solenoid 89 will not be energized and relay arm 88 will be open. Thus, even if program stud 65a did close switch arm 87, the fast shutter control circuit would not be completed because relay arm 88 would be open.

In a very similar manner a slow shutter speed may be obtained by appropriate location of the program studs 65b or 66b on the image carriers 10b or 11b of Projector B. The slow shutter control circuit includes a switch arm 90 adjacent the image carrier 11b and adapted to be operated by a program stud 66b thereon to close a normally open contact which is connected to the normally open contact of a switch arm 91. The other side of switch arm 91 is connected by a wire 92 to the A. C. ground bus. The switch arm 90 is connected to one side of a solenoid 93 which has its other side connected to the A. C. supply bus. Hence, closing of switch arm 90 will energize solenoid 93 to close a normally open relay arm 94. One side of relay arm 94 is connected to the A. C. supply bus and the other side of relay arm 94 is connected to the slow dissolve bus. A solenoid 95b has one side connected to said slow dissolve bus and the other side connected to the A. C. ground bus and is consequently energized to move the contactor 70b from its normal position into engagement with a contact connected to one side of motor 69b, the other side of contactor 70b being connected through contactor 71b to the dissolve bus. The other side of the slow shutter operating circuit extends from motor 69b through switch arm 72b, relay arm 64b, which will be closed when the master control solenoid 45R is closed, through wire 73b and contactor 74b to the A. C. supply bus.

The interlocking relays for the slow shutter control circuit comprises a solenoid 96 having one side connected to the "right" bus and the other side connected to the A. C. supply bus and arranged to close the normally open switch arm 91. A normally open switch arm 97 has one side connected to the normally open contact which may be engaged by the switch arm 98 adjacent the image carrier 10b. A solenoid 99 has one side connected to the "left" bus and the other side connected to the A. C. supply bus and is arranged to close the switch arm 97. As before, it is not possible simultaneously to energize solenoids 96 and 99 and only one of switch arms 90 or 98 can be effective to establish a slow speed shutter control circuit.

The slow shutter motor 69b has its operating control circuit completed through 70b which is moved by solenoid 95b to its unnormal position to open the operating circuit for the motor 68b. Since the operating circuit for motor 67a is normally opened, on account of the normal position of contactor 71a, only the slow speed shutter driving motor 69b will be energized and as before stated those motors will not be driven by rotation of gear 21 because of the overrunning clutches between motors 67b and 68b and the gear 21b.

The most spectacular effect obtainable with the control system of the present invention is a so-called "machine gun" effect during which the entire series or bank of projector assemblies is successively operated. Again, this effect is obtained by the arrangement of shutter operating control circuits which are completed or caused to be prepared by programing studs on an image carrier. As herein disclosed Projector C controls such machine gun effect. The first shutter control circuit for this purpose includes a switch arm 100 located to be moved against a normally open contact by a program stud 66c. Said switch arm 100 is connected to one side of a solenoid 101 which has its other side connected to the A. C. supply bus. From the normally open contact this shutter control circuit extends to the normally open contact adjacent a switch arm 102, the other side of which is connected through a wire 103 to the A. C. ground bus. A pair of interlocking relays comprise a solenoid 104 having one side connected to the A. C. supply bus and having the other side connected to the "right" bus and arranged to close the switch arm 102. The other interlocking relay includes a normally open switch arm 105 having one side connected to the A. C. ground bus and, when closed, having the other side connected to a normally open contact arranged to be engaged by a switch arm 106 adjacent the image carrier 10c and adapted to be closed by a program stud 65c thereon. A solenoid 107 has one side connected to the A. C. supply bus and its other side connected to the "left" bus. Thus as before, only one of the switch arms 100 or 106 can be operative because of the interlocking effect of relay switch arms 102 and 105.

Energization of the solenoid 101 moves contactor 77 from its normal position and interrupts the connection between the A. C. supply bus and the simultaneous bus whereby all of the solenoids 75a, b, etc. are de-energized and all of the contactors 74, such as 74c, are open. Hence, it is no longer possible to operate the shutter assemblies simultaneously. The normally open contact adjacent the contactor 77 is connected to the machine gun bus and when solenoid 101 is energized the machine gun bus is connected to the A. C. supply bus through the contactor 77. A solenoid 108c has one side connected to the machine gun bus and its other side connected to the A. C. ground bus and is also energized when contactor 77 is moved by solenoid 101. A relay arm 109c is normally open but is closed when solenoid 108c is energized.

Closing of relay arms 109c establishes successive shutter control circuits which are closed by operation of the shutter on the preceding machine. For instance, the machine gun shutter control circuit for Projector B extends from one side of relay arm 109b through wire 73b, through relay arm 64b, when solenoid 63b is energized, thence through switch arm 72b, motor 68b, contactor 70b, contactor 71b to the dissolve bus. The other side of relay arm 109b is connected by a wire 110b to a switch arm 111a in engagement with the periphery of switch cam 24a. An opening in the circuit occurs here because the contact engaged by arm 111a is connected to the relay arm 62a which will be opened when the next or "right" cycle takes place. However, after the shutter movement for Projector A has been completed, the switch cam 24a has been moved so that switch arm 111a now engages the other of the double pole contacts and the circuit continues through relay arm 64a, wire 73a, relay arm 109a to the A. C. supply bus. Thus, the motor circuit for Projector B is now completed through the contact made on Projector A by switch arm 111a. In a like manner the machine gun motor operating circuit for Projector C extends from one side of relay arm 109c through wire 73c, relay arm 64c, switch arm 72c, motor 68c, contactors 70c and 71c to the dissolve bus, the other side of Projector C machine gun shutter operating the circuit extending through wire 110c, switch arm 111b now on open circuit but after operation of Projector B completed through the other of the double pole contacts to relay arm 64b, wire 73b, wire 110b, switch arm 111a, relay arm 64a, wire 73a, relay arm 109a to the A. C. supply. So for each additional projector in the bank of projectors the operation of the shutter assembly of the previous projector controls the initiation of the shutter cycle on the subsequent projector.

As shown herein, the shutter operating cycle of the succeeding projector begins at the same time that the shutter operating cycle of the previous projector is completed. However, merely by relative rotation of the cams 24a, 24b and 24c or by variation of the form of rises thereon it is possible and within the scope of the invention to start the succeeding projector shutter cycle before the shutter cycle of the previous projector is completed.

While the machine gun operation just described was performed at medium shutter operating speed, it is preferable and has been found more effective to perform such machine gun projection at fast shutter speeds. Accordingly, there should be a program stud 66a on the image carrier 11a located to close the switch arm 79 at the same time that the program stud 66c on image carrier 11c closes the switch arm 100. Under these circumstances the master fast shutter control solenoid 83 will be energized and relay arm 84 closed to energize the fast dissolve bus and each of the solenoids 85a, etc. will be energized and each of the contactors 71a, etc. will be down so that all of the fast shutter operating motors 67a will be connected to drive the shutter assemblies. Under these conditions the shutter operating cycle of each machine will be completed more rapidly and the successive projection from each projector of the group will proceed in a very spectacular fashion.

It will be understood from the foregoing disclosure that an entire program of pictures or transparency slides can be projected with varying effects and in a fully automatic manner. The occurrence of the various projection effects is determined merely by placing a program stud 65 or 66 adjacent a corresponding slide on one of the control projectors, such as Projectors A, B or C. If a series of slides is to be introduced and to disappear by a medium speed cross-dissolve, no program studs are used. On the other hand, if it is desired to introduce a series of slides with a fast dissolve a program stud 65a or 66a is placed adjacent the slide of that series on image carriers 10a or 11a. However, if the slides are to be introduced with a slow cross-dissolve a program stud 65b or 66b is placed adjacent the corresponding slide of that series on image carrier 10b or 11b of Projector B.

The flexibility of the present control system is indicated by the fact that a series of slides may also be introduced by a fast dissolve and removed by a slow dissolve. This effect can be obtained by placing a program stud, such as 66a, on the image carrier 11a so as to close the switch arm 79 when a transparent slide 13a is about to be introduced in Projector A along with the corresponding slides of the other projectors. As a result, all of these slides will appear under fast dissolve conditions. In order to obtain a slow dissolve for removing the pictures a program stud 65b is placed on the image carrier 10b so as to close the switch arm 98 upon the next indexing cycle of carrier 10b, it being remembered that the indexing takes place first and establishes the character of shutter operation, in this case slow operation, and the slides will dissolve out at slow speed. Furthermore, any series of slides can be introduced with the machine gun effect merely by placing a program stud, such as 66c, to operate the switch arm 100 as the member of the series is moved into projecting position by image carrier 11c. By correspondingly placing program studs 66a on image carrier 11a or program studs 66b on image carrier 11b, the machine gun effect may be accomplished with fast or slow shutter operation and by omitting to put such studs 66a or 66b on the image carriers the machine gun effect will be accomplished with medium speed of shutter operation.

Since it is apparent that many modifications of the present control system are possible, the disclosure herein is to be construed in an illustrative sense and the scope of the invention is defined by the claims which follow.

Having now particularly described our invention what we desire to secure by Letters Patent of the United States and what we claim is:

1. In a control system for a plurality of projectors, the combination with a plurality of projector assemblies each comprising a pair of image carriers, a pair of indexing members respectively connected to said image carriers, and a pair of shutter assemblies associated with respective image carriers, of a master control means operated at predetermined intervals and including a master index control member and a master shutter control member, a plurality of index operating control means each corresponding to a projector assembly, supervised by said master index control member, and effecting simultaneous indexing of all the corresponding image carriers of said projector assemblies, and a plurality of shutter operating control means for each of said projector assemblies, supervised by said master shutter control member, and for operating said shutter assemblies to open that shutter assembly of each pair which is associated with the image carrier just indexed and to close the other shutter assembly.

2. In a control system for a plurality of projectors, the combination with a plurality of projector assemblies each comprising a pair of image carriers, a pair of indexing members respectively connected to said image carriers, and a pair of shutter assemblies associated with respective image carriers, of a master control means operated at predetermined intervals and including a master index control member and a master shutter control member in timed relation thereto, a plurality of index operating control means each corresponding to a projector assembly, supervised by said master index control member, and effecting simultaneous indexing of all the corresponding image carriers of said projector assemblies, and a plurality of shutter operating control means for each of said projector assemblies and supervised by said master shutter control member which is in such timed relation to said master index control member of the master control means that all of the corresponding image carriers are indexed before any of said shutter assemblies are operated.

3. In a control system for a plurality of projectors, the combination with a plurality of projector assemblies each comprising a pair of image carriers, a pair of indexing members respectively connected to said image carriers and for alternatively indexing said image carriers, and a pair of shutter assemblies respectively associated with an image carrier and oppositely movable so that one shutter assembly is being closed while the other shutter assembly is being opened, of a master control means operated at predetermined intervals and including a master index control member, and a master shutter control member operated in timed relation to each other, a plurality of index operating control means each corresponding to a projector assembly, supervised by the master index control member of said master control means and for indexing all of the corresponding image carriers of all of said projector assemblies simultaneously, and a plurality of shutter operating control means supervised by the master shutter control member of said master control means and for simultaneously operating all of said shutter assemblies to dissolve the image from one image carrier into the image from the other image carrier only after all of said other image carriers have been indexed.

4. In a control system for a plurality of projectors, the combination with a plurality of projector assemblies each comprising a pair of image carriers, a pair of indexing members respectively connected to said image carriers and a pair of shutter assemblies associated with respective image carriers, of a master control means operated at predetermined intervals and including a master index control member and a master shutter control member, a plurality of index operating control means each corresponding to a projector assembly, supervised by said master index control member, and effecting simultaneous indexing of all the corresponding image carriers of said projector assembly, a plurality of shutter operating control circuits for each projector assembly, a program projection on the image carrier of one of said projector assemblies, and a master shutter operating control circuit supervising one of said shutter operating control circuits for each projector assembly, including a normally opened switch arranged to be closed by said program projection on one image carrier, and for establishing one of said shutter operating control circuits.

5. In a control system for automatic operation of a photographic projector, the combination with a projector assembly comprising a pair of image carriers, a pair of shutter assemblies associated with respective image carriers, and a driving means connected to said shutter assemblies for closing one of said shutter assemblies and opening the other, of a program projection on one of said image carriers, a motor connected to said driving means for operating the same and said shutter assemblies at a definite speed, a motor circuit for said motor and including one pole of a normally closed double pole contactor, a second motor connected to said driving means for moving the same and said shutter assemblies at a different speed than said definite speed, a second motor circuit for said second motor and including the other pole of said contactor, a pair of motor control circuits each including a normally open switch arm adjacent respective image carriers and each including an interlocking relay permitting only one of said motor control circuits to be completed at one time, a master control circuit for energizing either of said interlocking relays, and a master control circuit including a normally open relay and a solenoid for moving said contactor against the other pole to interrupt the first-mentioned motor circuit and close the second motor circuit only when a projection on an image carrier corresponding to the energized interlocking relay closes the respective pair of normally open contactors.

6. In a control system for automatically operating a plurality of photographic projectors, the combination with a plurality of projector assemblies each comprising an image carrier, a shutter assembly associated therewith and movable to open and closed positions, a driving member connected to said shutter assembly for operating the same, and a pair of motors both operatively connected to said driving member, one motor being adapted and arranged to move said driving member and operate said shutter assembly at one speed and the other motor being adapted and arranged to move said driving member and operate said shutter assembly at another speed, of a program projection on an image carrier of only one of said projector assemblies, a plurality of local shutter motor operating circuits each including one of the first-mentioned motors and a normaly closed double pole contactor, a second plurality of local shutter motor operating circuits each including one of said other motors and the other pole of said contactors, and a master shutter control circuit adapted to be energized when said program projection closes a normally open switch arm and including a plurality of solenoids each arranged to move each of said contactors to open all of the first-mentioned local shutter operating circuits and to close all of said second local shutter motor operating circuits.

7. In a control system for a plurality of projectors, the combination with a plurality of projector assemblies each comprising an image carrier, an indexing assembly connected to said image carrier, a shutter assembly associated with said image carrier, and program projections on certain of said image carriers, of a master control means operated at predetermined intervals and including a master index control member and a master shutter control member, a plurality of index operating control means each corresponding to a projector assembly, and effecting simultaneous indexing of all of said image carriers, and a plurality of shutter operating control circuits for each projector assembly one of which is adapted to be established by a pair of contacts which are operated by one of said program projections, and supervised by said master shutter control member, said master index control member being first operative for simultaneous indexing of all carriers so that the programing projections thereon may effect arrangement of the shutter control circuits for the various program effects which will occur when said shutter control member initiates them.

8. In a control system for a plurality of projectors, the combination with a plurality of projector assemblies each comprising a pair of image carriers, a pair of indexing members respectively connected to said image carriers, and a pair of shutter assemblies associated with respective image carriers, of a pair of index control circuits for each projector assembly, each corresponding to an image carrier, and each including a normally open relay arm, a pair of shutter control circuits for each projector, each corresponding to a shutter assembly, and each including a normally open relay arm, and a master control means including a contactor having two different positions, adapted in one position to supervise closing the relay arms in the index control circuit and shutter control circuit corresponding to one image carrier and shutter assembly, and adapted in its other position to supervise closing of the relay arms in the index control circuit and shutter control circuit corresponding to the other image carrier and shutter assembly, and including a master control member operated at intervals and for alternatively moving said contactor from one position to the other.

9. In a control system for automatically operating a plurality of photographic projectors, the combination with a plurality of projector assemblies each comprising a pair of image carriers, a pair of indexing members respectively connected to said image carriers and operative alternatively to move one of said image carriers, and a motor connected to said indexing members, of a pair of index motor control circuits for each projector assembly each including a normally open relay arm, a pair of master index control circuits each including a solenoid for respectively closing said normally open relay arms, and a master index control member operated at predetermined intervals alternatively to supervise energization of either master index control circuit to close corresponding ones of each pair of index motor control circuits for all of the projector assemblies.

10. In a control system for automatically operating a plurality of photographic projectors, the combination with a plurality of projector assemblies each comprising a pair of image carriers, a pair of indexing members respectively connected to said image carriers, an indexing motor operatively connected to said indexing member, and a pair of limit cams also operated by said motor and each having rises in timed displacement to each other, of a pair of index motor control circuits for each projector assembly, each including a limit switch and a normally open relay arm, and a pair of master index control circuits each including a solenoid for respectively closing said normally open relay arm, and a master index control means operated at intervals for alternative energization of only one of said master index control circuits, whereby closing of both limit switches during indexing is ineffective to interrupt the same.

11. In a control system for a plurality of projectors, the combination with a projector assembly comprising an image carrier, and a shutter assembly associated with said image carrier and movable to open and closed positions, of a driving means connected to said shutter assembly and including a switch cam movable to positions corresponding to the position of said shutter assembly, a motor operatively connected to said driving means for opening and closing said shutter assembly at a definite speed, and a shutter operating circuit including said motor, a contact and a switch arm engaging the same and disengaged therefrom after said switch cam has been moved by operation of said motor completely to change the position of said shutter assembly.

12. In a control system for a plurality of projectors, the combination with a projector assembly comprising a pair of image carriers and program projections on one of said carriers, a pair of shutter assemblies associated with respective image carriers and a driving member connected to said shutter assemblies and moving a plurality of switch cams, of a plurality of motors connected to said driving member and each adapted to move said shutter driving member at a definite speed, a master shutter control circuit corresponding to one of said motors and respectively including a switch arm adapted to be operated by a program projection on said image carrier, and local shutter operating circuits for each assembly, supervised by said master shutter control circuit and each including a switch arm opened by a corresponding switch cam after one of said motors has moved said driving member to complete a shutter assembly operation.

13. In a control system for a plurality of projectors, the combination with a projector assembly comprising an image carrier, and a shutter assembly associated with said image carrier and movable to open and closed positions, of a driving means connected to said shutter assembly and including a switch cam, a motor operatively connected to said driving means for opening and closing said shutter assembly at a definite speed, and a shutter operating circuit including said motor and a switch arm, having one branch including a contact engaged by said switch arm during opening of said shutter assembly and disengaged from said switch arm after said switch cam has been moved by the operation of said motor completely to open said shutter assembly, and another branch of said shutter operating circuit including a contact engaged by said switch arm during closing of said shutter assembly and disengaged from said switch arm after said switch cam has been moved by the operation of said motor completely to close said shutter assembly.

14. In a control system for a plurality of projectors, the combination with a projector assembly comprising an image carrier, a shutter assembly associated with said image carrier and movable to open and closed positions, and a driving member connected to said shutter assembly for operating the same, of a pair of motors both operatively connected to said driving member, one motor being arranged to move said driving member and operate said shutter assembly at one speed and the other motor being arranged to move said driving member and operate said shutter assembly at another speed, a motor operating circuit including said one motor, a second motor operating circuit including said other motor, and a double-throw contactor connected to close the first-mentioned motor circuit in one position thereof and to open said first-mentioned motor circuit and close said second motor operating circuit in the other position thereof.

15. In a control system for a plurality of projectors, the combination with a projector assembly comprising an image carrier, a shutter assembly associated with said image carrier and movable to open and closed positions, and a driving member connected to said shutter assembly for operating the same, of a pair of motors both operatively connected to said driving member, one motor being arranged to move said driving member and operate said shutter assembly at one speed and the other motor being arranged to move said driving member and operate said shutter assembly at another speed, a shutter motor operating circuit including said one motor and a normally closed double-pole contactor, a second shutter motor operating circuit including said other motor and the other pole of said contactor, and a shutter control circuit including a solenoid adapted when energized to move said contactor to open the first-mentioned shutter motor operating circuit and to close said second shutter motor operating circuit.

16. In a control system for a plurality of projectors, the combination with a projector assembly comprising an image carrier having a program projection, a shutter assembly associated with said image carrier and movable to open and closed positions, and a driving member connected to said shutter assembly for operating the same, of a pair of motors both operatively connected to said driving member, one motor being arranged to move said driving member and operate said shutter assembly at one speed and the other motor being arranged to move said driving member and operate said shutter assembly at another speed, a shutter motor operating circuit including said one motor and a double-pole contactor, a second shutter motor operating circuit including said other motor and the other pole of said contactor, and a shutter control circuit including a solenoid and a switch adapted to be closed by said program projection to complete said shutter control circuit and energize said solenoid to move said contactor to open the first-mentioned shutter motor operating circuit and to close said second shutter motor operating circuit.

17. In a control system for a plurality of projectors, the combination with at least a pair of projector assemblies each comprising an image carrier, a shutter assembly associated with each image carrier, a driving member connected to each shutter assembly, and program projections on each of two of said image carriers, of a motor connected to said driving member for moving the same at a definite speed, a shutter motor circuit including said motor and including a normally closed pole of each of a pair of double-pole normally closed contactors, a second motor connected to said driving member for moving the same at a faster speed, a second shutter motor circuit including said second motor and including the other pole of one of the double-pole contactors in the first-mentioned shutter motor circuit, a third motor connected to said driving member for moving the same at a slower speed, a third shutter motor circuit including said third motor and including the other pole of the other double-pole contactor in the first-mentioned shutter motor circuit, a master shutter control circuit including a normally open switch arm adjacent one of said image carriers and adapted to be closed by the program projection thereon, and a local shutter control circuit energized by said master control circuit and including a solenoid adapted when energized to move said one contactor to interrupt the first-mentioned shutter motor circuit and close the second shutter motor circuit, and a second master shutter control circuit including a normally open switch arm adjacent another of said image carriers and adapted to be closed by a program projection thereon, and a second local shutter control circuit energized by said second master shutter control circuit and including a solenoid adapted when energized to move said other contactor to interrupt the first-mentioned shutter motor circuit and close said third shutter motor circuit.

18. In a control system for successively operating a plurality of photographic projectors, the combination with a plurality of projector assemblies each comprising an image carrier, a shutter assembly associated with each image carrier, and a driving means connected to each shutter assembly and including a cam, of a shutter motor connected to each of said driving means and for operating said shutter assemblies, and a plurality of motor circuits each including a shutter motor for one projector assembly and each including a switch means maintained inoperative by the cam of the driving means of another projector assembly until the shutter motor thereof has moved its cam and adapted, upon movement of the cam of said other projector, to place the motor circuit of said one projector in series with the previously completed motor circuits of the operated projectors whereby said motor circuits are closed successively.

19. In a control system for successively operating a plurality of photographic projectors, the combination with a plurality of projector assemblies each comprising an image carrier, a shutter assembly associated therewith, and a driving means connected to each shutter assembly and including a cam, of a plurality of shutter motors respectively connected to each of said driving means for operating each shutter assembly, a local motor circuit including the shutter motor of the projector to be operated first and adapted when energized to operate the driving means and cam thereof, a plurality of other shutter motor circuits each including a switch means maintained inoperative by the cam on the driving means of the preceding projector and operated by the movement of its driving means and cam to connect in series said local motor circuit and the motor circuits of other operated projectors whereby the shutter assemblies of the several projectors are successively operated.

20. In a control system for successively operating a plurality of photographic projectors, the combination with a plurality of projector assemblies each comprising an image carrier, one of which carries a program projection, a shutter assembly associated with each image carrier, and a driving means connected to each shutter assembly and including a cam, of a shutter motor connected to each of said driving means and for operating said shutter assemblies, a plurality of local shutter operating circuits each including a normally open contactor and a switch arm adjacent and opened by the cam on the driving means of another projector assembly, a plurality of local control circuits each including a solenoid for closing said contactor and adapted when energized to connect said local shutter operating circuit in series, and a master control circuit having a normally open switch arm adjacent an image carrier, adapted to be closed by a program projection thereon, and for energizing said local control circuit to cause said local operating circuit to be placed in series.

21. In a control system for simultaneously or successively operating a plurality of photographic projectors, the combination with a plurality of projector assemblies each comprising an image carrier, one of which carries a program projection, a shutter assembly associated with each image carrier, and a driving means connected to each shutter assembly and including a cam, of a plurality of motors respectively connected to each of said driving means for operating each shutter assembly, a plurality of motor circuits each including a respective motor, each including a pair of contacts and arranged in parallel for simultaneous energization when said contacts are closed, a second plurality of motor circuits arranged in series, each also including one of said motors, a pair of contacts, and all except the circuit for the first projector assembly having a switch adjacent the cam of the driving means of another projector and held in open position thereby, said second motor circuit for the first projector being completed by closing of the contacts thereon, and a master control circuit including a double-pole contactor adapted in one position to supervise the closing of all the contacts in the first-mentioned motor circuit for simultaneous operation of said shutter assembly, and including a switch located to be operated by said program projection on one of said image carriers for movement of said double-pole contactor to its other position to supervise the closing of all the contacts in the second-mentioned motor circuit for series arrangement thereof and successive energization as the driving means of each preceding projector assembly is moved for closing of the respective switch.

ALBERT B. FULLER.
FORDYCE TUTTLE.